US011770395B2

(12) United States Patent
Ogura et al.

(10) Patent No.: US 11,770,395 B2
(45) Date of Patent: Sep. 26, 2023

(54) INFORMATION PROCESSING APPARATUS, COMPUTER PROGRAM PRODUCT, AND INFORMATION PROCESSING SYSTEM

(71) Applicant: KABUSHIKI KAISHA TOSHIBA, Tokyo (JP)

(72) Inventors: Naoki Ogura, Kanagawa (JP); Jun Kanai, Tokyo (JP); Hiroyoshi Haruki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 71 days.

(21) Appl. No.: 17/446,448

(22) Filed: Aug. 30, 2021

(65) Prior Publication Data
US 2022/0141241 A1 May 5, 2022

(30) Foreign Application Priority Data
Nov. 5, 2020 (JP) .................................. 2020-185040

(51) Int. Cl.
*G06F 21/00* (2013.01)
*H04L 9/40* (2022.01)
(52) U.S. Cl.
CPC ........ *H04L 63/1425* (2013.01); *H04L 63/101* (2013.01)
(58) Field of Classification Search
CPC ........................... H04L 63/1425; H04L 63/101
See application file for complete search history.

(56) References Cited

U.S. PATENT DOCUMENTS

| 9,405,900 B2* | 8/2016 | Dixit | G06F 21/55 |
| 10,671,726 B1* | 6/2020 | Paithane | H04L 63/1416 |
| 2006/0236374 A1* | 10/2006 | Hartman | H04L 63/1416 |
| | | | 726/3 |
| 2018/0053401 A1* | 2/2018 | Martin | H04L 67/10 |
| 2019/0222577 A1* | 7/2019 | Eliyahu | H04L 63/102 |
| 2020/0201300 A1* | 6/2020 | Baba | G05B 19/41835 |
| 2020/0233938 A1* | 7/2020 | Sirianni | G06F 21/6281 |
| 2021/0109832 A1* | 4/2021 | Ladkani | G06F 11/076 |

(Continued)

FOREIGN PATENT DOCUMENTS

JP 2010-182019 A 8/2010
JP 2013-247664 A 12/2013

*Primary Examiner* — Shin-Hon (Eric) Chen
(74) *Attorney, Agent, or Firm* — Finnegan, Henderson, Farabow, Garrett & Dunner, LLP

(57) ABSTRACT

An information processing apparatus according to an embodiment includes a list storage unit and processor. The list storage unit stores therein allow lists for module processing types, and each allow list describes an execution-permitted system operation. The processor functions as an operation detecting unit, a process specifying unit, a log specifying unit, a type specifying unit, and an output unit. The operation detecting unit detects execution of any of system operations. The process specifying unit specifies a target process that has executed execution-detected system operation. The log specifying unit specifies a target operation log. The type specifying unit specifies a type of target module processing that executed execution-detected system operation by analyzing the target operation log. The output unit outputs anomaly information when the allow list for the target module processing type does not include the execution-detected system operation.

4 Claims, 7 Drawing Sheets

(56) References Cited

U.S. PATENT DOCUMENTS

2021/0149790 A1\* 5/2021 Renner ............... G06F 11/0778
2022/0191227 A1\* 6/2022 Pfleger de Aguiar ....................... H04L 63/1408

\* cited by examiner

INFORMATION PROCESSING APPARATUS, COMPUTER PROGRAM PRODUCT, AND INFORMATION PROCESSING SYSTEM

CROSS-REFERENCE TO RELATED APPLICATIONS

This application is based upon and claims the benefit of priority from Japanese Patent Application No. 2020-185040, filed on Nov. 5, 2020; the entire contents of which are incorporated herein by reference.

FIELD

Embodiments described herein relate generally to an information processing apparatus, a computer program product, and an information processing system.

BACKGROUND

If cyberattacks take place on industrial control systems of factories, power stations, and the like, a serious damage is caused. To suppress the damage to the minimum, it is important for industrial control systems to promptly detect an anomaly event of a potential cyberattack.

As a method for detecting an anomaly event, a known method is monitoring a file operated by the process, and comparing the file with a file operated with the process in a normal state. Such a method is capable of surely detecting that anomaly processing is executed, when the number of types of files operated with the process in the normal state is small.

However, the process or the like executing a command in response to an instruction from a user selectively executes many types of processing. Such a process operates a very large number of types of files. Accordingly, even when anomaly processing is executed, such a process has a potential of operating a file that is operated in the normal state. As such, the method described above has difficulty in sufficiently detecting anomaly of such a process. For example, in the case where a computer program component included in a shared library is invaded, the method described above cannot detect anomaly even when the process calls and executes the invaded program component from the shared library.

DETAILED DESCRIPTION

An information processing apparatus according to an embodiment includes a list storage unit and a processor. The list storage unit is configured to store therein allow lists for respective types of module processing, where each of the allow lists describes an execution-permitted system operation. The processor functions as an operation detecting unit, a process specifying unit, a log specifying unit, a type specifying unit, and an output unit. The operation detecting unit is configured to detect that any of system operations is executed. The process specifying unit is configured to specify a target process serving as a process that has executed execution-detected system operation. The log specifying unit is configured to specify a target operation log serving as an operation log indicating history of a processing content of the target process. The type specifying unit is configured to specify a type of target module processing serving as the module processing that has executed the execution-detected system operation, by analyzing the target operation log. The output unit is configured to output anomaly information indicating that an anomaly occurs, when the allow list for the type of the target module processing does not include the execution-detected system operation. An objective to be solved by embodiments is to provide an information processing apparatus, a computer program product, and an information processing system surely detecting anomaly.

An information processing system 10 according to an embodiment will now be described hereinafter with reference to drawings.

Figure 1:
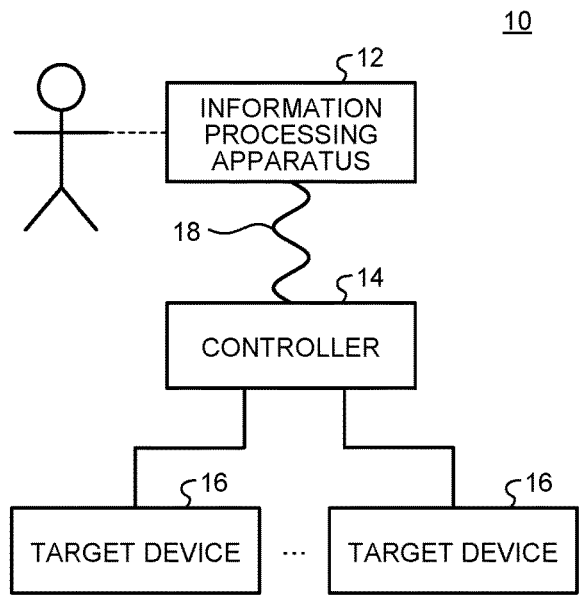
FIG. 1 is a diagram illustrating an information processing system according to an embodiment.

FIG. 1 is a diagram illustrating the information processing system 10. In the present embodiment, the information processing system 10 controls equipment installed in a factory, a power station, and the like, in accordance with an instruction from the user. The equipment is, for example, a pump, a turbine, a boiler, a motor, or the like. The information processing system 10 is not limited to a system controlling such equipment, but may be another control system or processing system. For example, the information processing system 10 may be a client server system acquiring information from a server in accordance with an instruction from the user.

The information processing system 10 includes an information processing apparatus 12, a controller 14, and one or more target devices 16.

The information processing apparatus 12 is a computer. The information processing apparatus 12 is capable of receiving an instruction from the user, and displaying and outputting information to the user. For example, the information processing apparatus 12 includes an input/output device, such as a keyboard, a mouse, a display, and a touch panel.

The information processing apparatus 12 is connected to the controller 14 via a network 18. In this manner, the information processing apparatus 12 can mutually transmit and receive data to and from the controller 14. The network 18 may be a wireless or wired network. The network 18 may be connected via one or more devices, such as a router, a switching hub, and a relay server.

The controller 14 receives a control command from the information processing apparatus 12, and controls operations of one of the target devices 16 or each of two or more of the target devices 16 in accordance with the control command. One of the target devices 16 or each of two or more of the target devices 16 is a device or equipment operating in response to control from the controller 14. In the present embodiment, one of the target devices 16 or each of two or more of the target devices 16 is a pump, a turbine, a boiler, a motor, or the like.

The information processing apparatus 12 controls one or more of the target devices 16 by providing an instruction to the controller 14. For example, the information processing apparatus 12 provides an instruction to the controller 14 in accordance with a control request from the user. In the present embodiment, the information processing apparatus 12 includes a memory and a processor. The processor executes an operating system. In addition, the processor executes an application computer program to control operations of one or more of the target devices 16, under the control of the operating system.

The processor controls one or more of the target devices 16 by executing the application computer program. The processor may execute a plurality of application computer programs in parallel.

In addition, in the present embodiment, the processor executes a monitoring computer program detecting that an anomaly occurs in the process. The process is processing executed with the application computer program being executed with the processor. The monitoring computer program may be an application computer program or a computer program incorporated in a part of the operating system.

In the present embodiment, the processor also executes an anomaly monitoring computer program dealing with an anomaly. The anomaly monitoring computer program may be an application computer program or a computer program incorporated in a part of the operating system.

Figure 2:
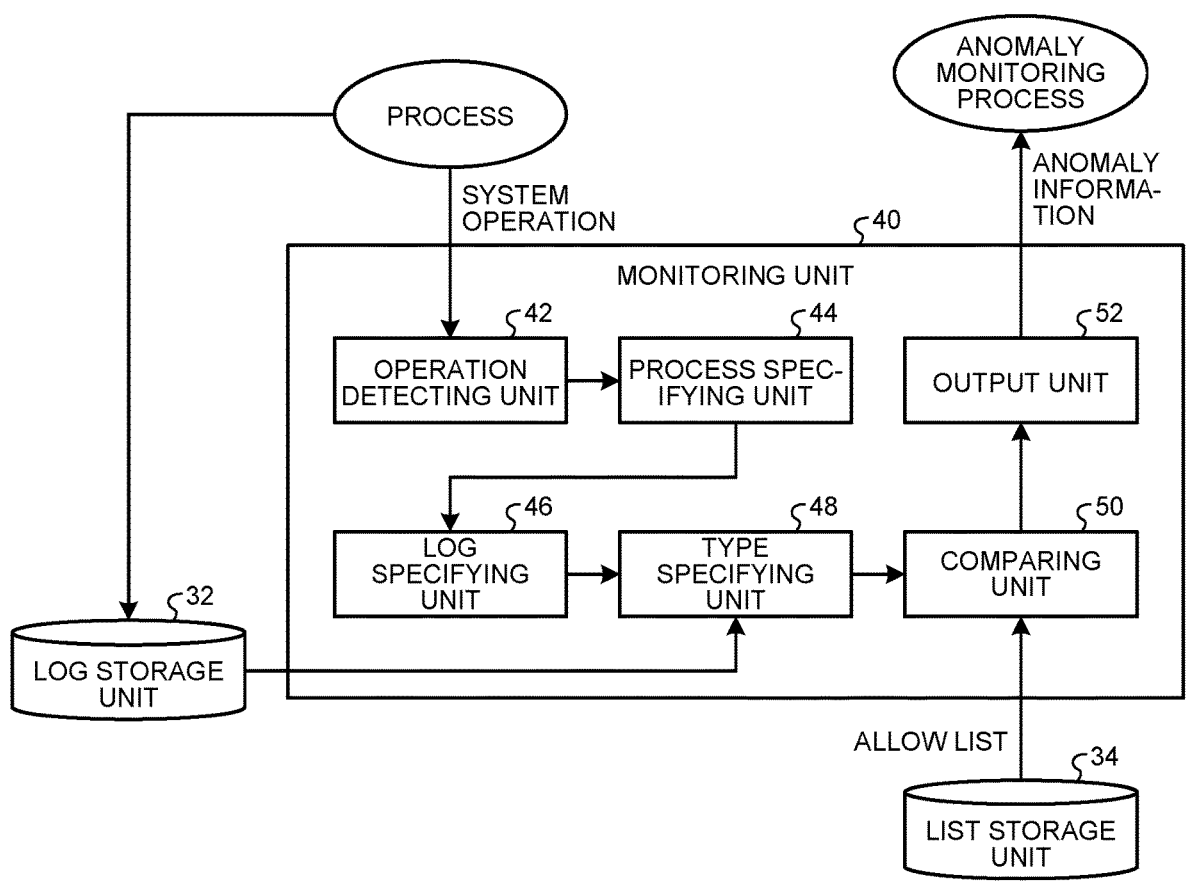
FIG. 2 is a diagram illustrating functional configuration of an information processing apparatus according to the embodiment.

FIG. 2 is a diagram illustrating functional configuration of the information processing apparatus 12. The information processing apparatus 12 includes a log storage unit 32, a list storage unit 34, and a monitoring unit 40.

The log storage unit 32 is achieved with a memory. The log storage unit 32 stores therein an operation log indicating a history of the processing contents of process. When each of processes executes module processing, each of the processes records information indicating the content of the executed module processing on a corresponding operation log.

The module processing is, for example, processing executed with a computer program component managed with the operating system. The computer program component is, for example, a computer program included in a shared library, and installed in an application computer program and executed. The process is capable of executing corresponding module processing by calling or loading the computer program component and executing the called or loaded computer program component.

The list storage unit 34 is achieved with a memory. The list storage unit 34 stores therein allow lists for respective types of module processing, and each of the allow lists describes an execution-permitted system operation.

The system operation is an operation to call a function incorporated in the operating system and causing the function to execute the processing in the process. For example, the system operation is a system call to call a function of the operating system with the process. Examples of the system operation include opening a file, reading a file, writing to a file, executing a file, generating a network socket, and executing communication via the network socket.

The allow list may describe sets each composed of an execution-permitted system operation and a processing target for which the system operation is permitted. For example, when the execution-permitted system operation is opening a file, the allow list describes sets each composed of information indicating opening a file and a path of the file serving as a target to be opened.

When a plurality of types of application computer programs is executed, the list storage unit 34 stores therein an allow list for each of the application computer programs and each of types of module processing.

In addition, the list storage unit 34 does not necessarily store therein an allow list for each of all the executable types of module processing. In this case, the list storage unit 34 stores therein an allow list for one of predetermined types or each of two or more of the predetermined types of module processing. One of the predetermined types or each of two or more of the predetermined types of module processing serves as a part of the executable types of module processing.

In the case where the list storage unit 34 stores therein an allow list for each of one or a plurality of specific types of module processing, the list storage unit 34 may store therein an allow list for a general type of module processing. The general type is a type indicating all the types that are not included in one of the specific types or two or more of the specific types of module processing, in a unified manner.

The allow lists as described above are generated in advance by the creator of the application computer program, the system manager, or the like. The allow lists may be prepared by collecting system operations during a normal operation.

The monitoring unit 40 is achieved by executing a monitoring computer program with the processor. Specifically, the processor functions as the monitoring unit 40 by executing the monitoring computer program.

The monitoring unit 40 detects an anomaly in the process. When an anomaly is detected in the process, the monitoring unit 40 outputs anomaly information to the anomaly monitoring process. The anomaly monitoring process is processing of the anomaly monitoring computer program being executed with the processor. In the anomaly monitoring process, when the processor receives the anomaly information from the monitoring unit 40, the processor executes anomaly monitoring process. As the anomaly monitoring process, for example, the processor notifies the user of occurrence of an anomaly by displaying a popup window, stops the process in which the anomaly occurs, executes backup processing, or stops the operation of the target device 16 serving as the control target of the process in which the anomaly occurs.

The monitoring unit 40 includes an operation detecting unit 42, a process specifying unit 44, a log specifying unit 46, a type specifying unit 48, a comparing unit 50, and an output unit 52.

The operation detecting unit 42 detects that any system operation is executed. The operation detecting unit 42 may detect that a specific system operation serving as a predetermined system operation is executed. For example, the operation detecting unit 42 detects that opening a file is executed. The operation detecting unit 42 may also specify a processing target for the specific system operation execution of which is detected. For example, when the specific system operation is opening a file, the operation detecting unit 42 specifies the path of the file serving as a processing target for the specific system operation.

The process specifying unit 44 specifies a target process serving as a process that has executed execution-detected system operation. For example, the process specifying unit 44 specifies a process identifier identifying the target process. The process identifier is information assigned with the operating system to identify the process being executed.

The log specifying unit 46 specifies a target operation log serving as an operation log indicating the history of the processing content of the target process. The log specifying unit 46 specifies, for example, a path of the file (log file) including the target operation log.

The type specifying unit 48 analyzes the target operation log to specify the type of the target module processing serving as module processing that has executed execution-detected system operation. For example, the type specifying unit 48 opens the log file stored in the specified path, analyzes information recorded on the log file, and specifies the type of the target module processing. For example, the type specifying unit 48 specifies a computer program component that has executed execution-detected system operation in a computer program component group included in the shared library.

When the list storage unit 34 stores therein an allow list for one of the predetermined specific types or each of two or more of the predetermined specific types of module processing and an allow list for the general type, the type specifying unit 48 specifies which of one of the specific types or two or more of the specific types the type of the target module processing corresponds to. When the type of the target module processing does not correspond to one of the specific types or two or more of the specific types, the type specifying unit 48 specifies that the type of the target module processing is the general type.

The comparing unit 50 specifies the allow list for the type of the target module processing, in the allow lists stored in the list storage unit 34. The comparing unit 50 determines whether the execution-detected system operation is included in the allow list for the type of the target module processing.

When it is detected that the specific system operation is executed, the comparing unit 50 determines whether a set of the execution-detected system operation and the specified processing target is included in the allow list for the type of the target module processing. For example, when the specific system operation is opening a file, the comparing unit 50 further determines whether the path of the file serving as the processing target of the execution-detected system operation agrees with a path of the file included in the allow list. The comparing unit 50 provides a determination result to the output unit 52.

When a plurality of types of application computer programs is executed, the comparing unit 50 specifies the allow list for the type of the target module processing of the application computer program corresponding to the target process. In this case, the comparing unit 50 determines whether the execution-detected system operation is included in the allow list for the type of the target module processing of the application computer program corresponding to the target process.

The output unit 52 receives the determination result from the comparing unit 50. When the execution-detected system operation is not included in the allow list for the type of the target module processing, the output unit 52 outputs anomaly information indicating that an anomaly occurs. For example, the output unit 52 outputs anomaly information, when the execution-detected system operation is not included in the allow list for the type of the target module processing of the application computer program corresponding to the target process.

Figure 3:
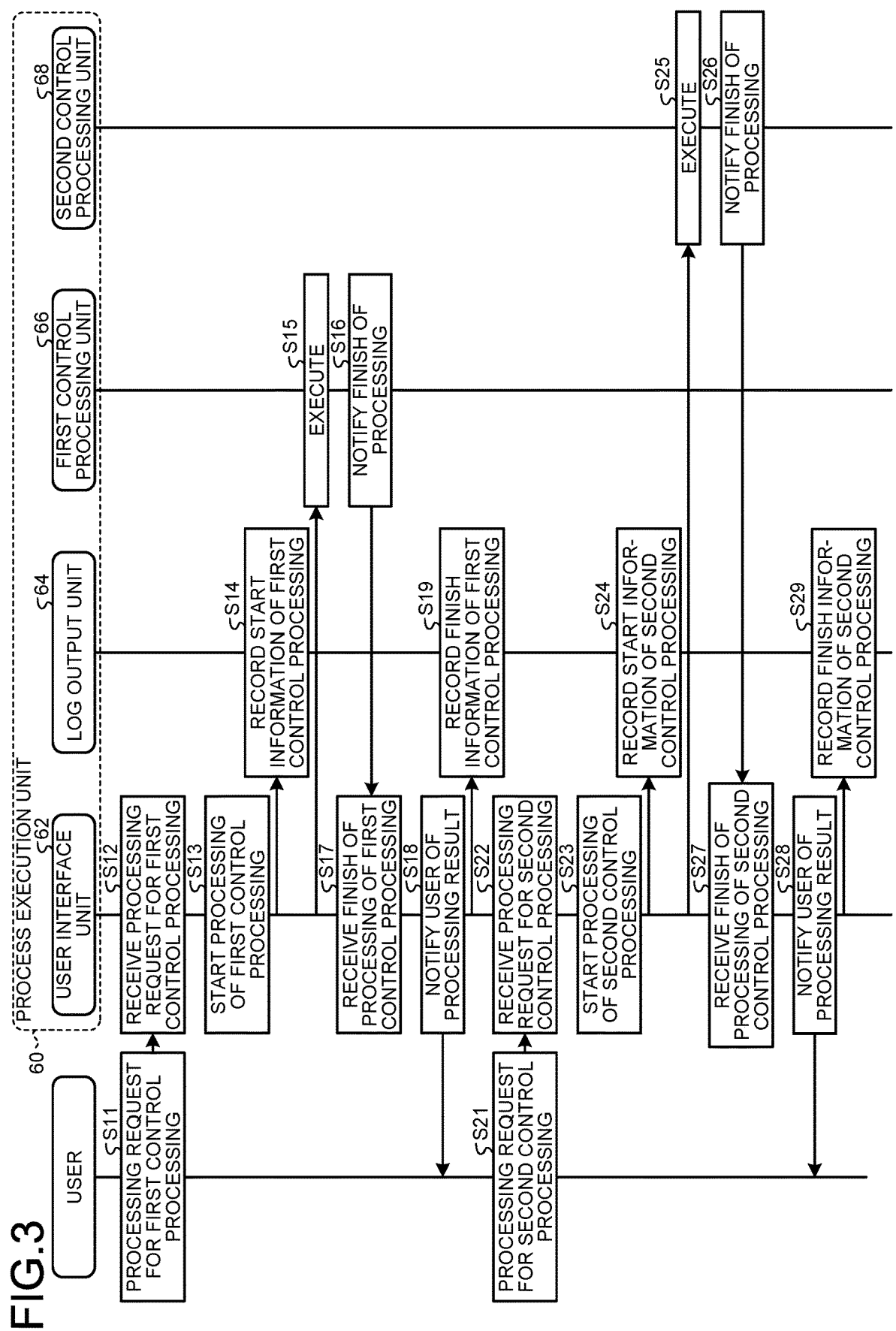
FIG. 3 is a sequence diagram illustrating an example of flow of processing of a first process.

FIG. 3 is a sequence diagram illustrating an example of flow of processing of a first process.

The processor of the information processing apparatus 12 functions as a process execution unit 60 by executing a certain application computer program. The process execution unit 60 executes first control processing and second control processing as the module processing.

The process execution unit 60 includes a user interface unit 62, a log output unit 64, a first control processing unit 66, and a second control processing unit 68. The process execution unit 60 as described above executes processing with the flow as illustrated in FIG. 3.

First, the user inputs a processing request for the first control processing to the information processing apparatus 12 (S11). For example, the user inputs a processing request for the first control processing to the information processing apparatus 12 by inputting a control value to a text box corresponding to the first control processing or clicking a button corresponding to the first control processing.

Thereafter, the user interface unit 62 receives the processing request for the first control processing (S12). Thereafter, the user interface unit 62 instructs the first control processing unit 66 to start the first control processing (S13). In this operation, at starting of the first control processing, the log output unit 64 records start information on an operation log of the first process (S14). The start information indicates the type of the module processing and indicates that the module processing is started. For example, the log output unit 64 records a character string "start of first control processing" and a time stamp indicating the start time of the processing on the operation log.

Thereafter, the first control processing unit 66 executes the first control processing (S15). Thereafter, at finishing of the first control processing, the first control processing unit 66 notifies the user interface unit 62 of the finish of processing of the first control processing (S16). For example, the first control processing unit 66 notifies the user interface unit 62 of a processing result of the first control processing, such as a return value of the function.

Thereafter, the user interface unit 62 receives the finish of processing of the first control processing (S17). Thereafter, the user interface unit 62 notifies the user of the processing result of the first control processing (S18). For example, the user interface unit 62 updates a control value corresponding to the first control processing and displayed on the display to the latest value. In this operation, at finishing of the first control processing, the log output unit 64 records finish information indicating the type of the module processing and indicating that the module processing is finished, on the operation log of the first process (S19). For example, the log output unit 64 records a character string "finish of first control processing" and a time stamp indicating the finish time of the processing on the operation log.

Thereafter, the user inputs a processing request for the second control processing to the information processing apparatus 12 (S21). Thereafter, the user interface unit 62 receives the processing request for the second control processing (S22). Thereafter, the user interface unit 62 instructs the second control processing unit 68 to start the second control processing (S23). In this operation, at starting of the second control processing, the log output unit 64 records start information on an operation log of the second process (S24). The start information indicates the type of the module processing and indicates that the module processing is started.

Thereafter, the second control processing unit 68 executes the second control processing (S25). Thereafter, at finishing of the second control processing, the second control processing unit 68 notifies the user interface unit 62 of the finish of processing of the second control processing (S26). Thereafter, the user interface unit 62 receives the finish of processing of the second control processing (S27). Thereafter, the user interface unit 62 notifies the user of the processing result of the second control processing (S28). In this operation, at finishing of the second control processing, the log output unit 64 records finish information indicating the type of the module processing and indicating that the module processing is finished, on the operation log of the second process (S29).

As described above, in each of the processes, at starting of the module processing, the processor of the information processing apparatus 12 records start information indicating the type of the module processing and indicating that the module processing is started, on the operation log. At finishing of the module processing, the processor of the information processing apparatus 12 also records finish information indicating the type of the module processing and indicating that the module processing is finished on the operation log.

Figure 4:
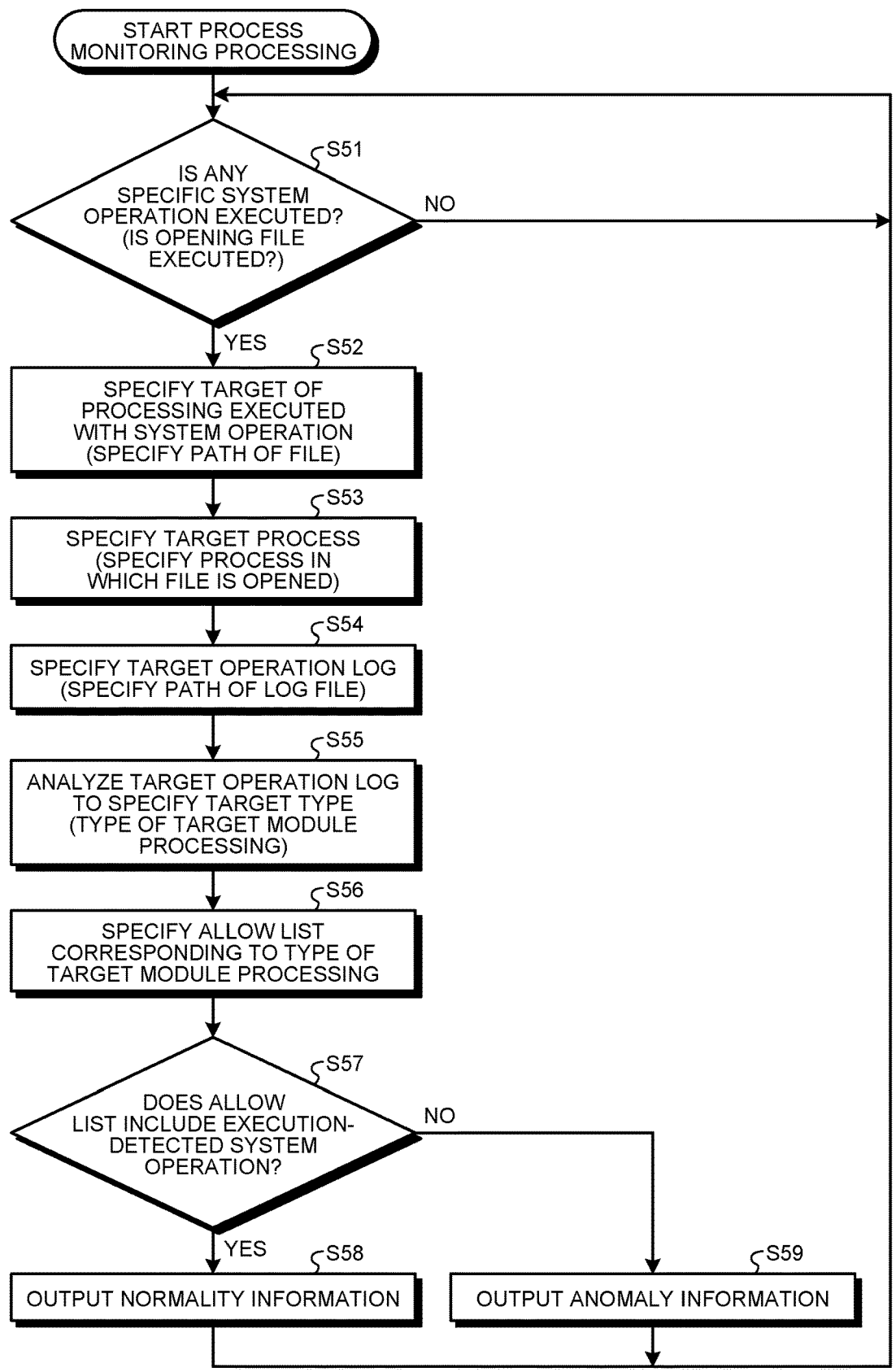
FIG. 4 is a flowchart illustrating flow of processing of a monitoring unit.

FIG. 4 is a flowchart illustrating flow of processing of the monitoring unit 40. The monitoring unit 40 detects an anomaly of the process by executing process monitoring processing with the flow illustrated in FIG. 4.

First, at Step S51, the monitoring unit 40 determines whether any system operation is executed in the process. In the present example, the monitoring unit 40 determines whether any specific system operation determined in advance is executed. For example, the monitoring unit 40 determines whether any file is opened.

When any system operation is executed (Yes at S51), the monitoring unit 40 proceeds the processing to S52. In the present example, any system operation (for example, opening a file) is executed (Yes at S51), the monitoring unit 40 proceeds the processing to S52. When no system operation is executed (No at S51), the monitoring unit 40 waits at S51. In the present example, when no system operation (for example, opening a file) is executed (No at S51), the monitoring unit 40 waits at S51.

At S52, the monitoring unit 40 specifies the processing target for the execution-detected system operation. In the present example, the monitoring unit 40 specifies the path of the file serving as the processing target for the specific system operation (for example, opening a file).

Thereafter, at S53, the monitoring unit specifies the target process. The target process is a process that has executed execution-detected system operation. For example, the monitoring unit 40 specifies the process identifier of the process in which opening a file is executed.

Thereafter, at S54, the monitoring unit 40 specifies the target operation log serving as the operation log indicating the history of the processing content of the target process. For example, the monitoring unit 40 specifies the path of the file (log file) including the target operation log.

Thereafter, at S55, the monitoring unit 40 specifies the type of the target module processing by analyzing the target operation log. The target module processing is module processing in which the execution-detected system operation is executed. For example, the monitoring unit 40 opens the log file stored in the specified path, analyzes the information recorded on the log file, and specifies the type of the target module processing.

Thereafter, at S56, the monitoring unit 40 specifies the allow list for the type of the target module processing, in a plurality of allow lists stored in the list storage unit 34. There are the cases where the list storage unit 34 stores therein allow lists for respective types of module processing for each of a plurality of application computer programs. In this case, the monitoring unit 40 specifies the allow list of the type of the target module processing of the application computer program corresponding to the target process.

Thereafter, at S57, the monitoring unit 40 determines whether the allow list for the target module processing includes the execution-detected system operation. In the case where it is detected that the specific system operation is executed, the monitoring unit 40 determines whether the allow list for the type of the target module processing includes a set of the execution-detected system operation and the specified processing target. For example, when the specific system operation is opening a file, the monitoring unit 40 further determines whether the path of the file serving as the processing target of the execution-detected system operation agrees with the path of the file included in the allow list.

When the allow list includes the execution-detected system operation (Yes at S57), the monitoring unit 40 proceeds the processing to S58. When the allow list does not include the execution-detected system operation (No at S57), the monitoring unit 40 proceeds the processing to S59.

At S58, the monitoring unit 40 outputs normality information indicating that no anomaly occurs to the anomaly monitoring process. The anomaly monitoring process executes no processing when it receives the normality information. The monitoring unit 40 may execute no processing at S58.

At S59, the monitoring unit 40 outputs anomaly information indicating that an anomaly occurs to the anomaly monitoring process. When the anomaly monitoring process receives the anomaly information, the anomaly monitoring process notifies the user of occurrence of an anomaly by, for example, displaying a popup window. When the anomaly monitoring process receives the anomaly information, the anomaly monitoring process may stop the process in which the anomaly occurs, execute backup processing, or stop the operation of the target device 16 serving as the control target of the process in which the anomaly occurs.

Thereafter, when the processing at S58 or S59 is finished, the monitoring unit 40 returns the processing to S51, and repeats the processing from S51. In this manner, the monitoring unit 40 can continue monitoring the process.

Figure 5:
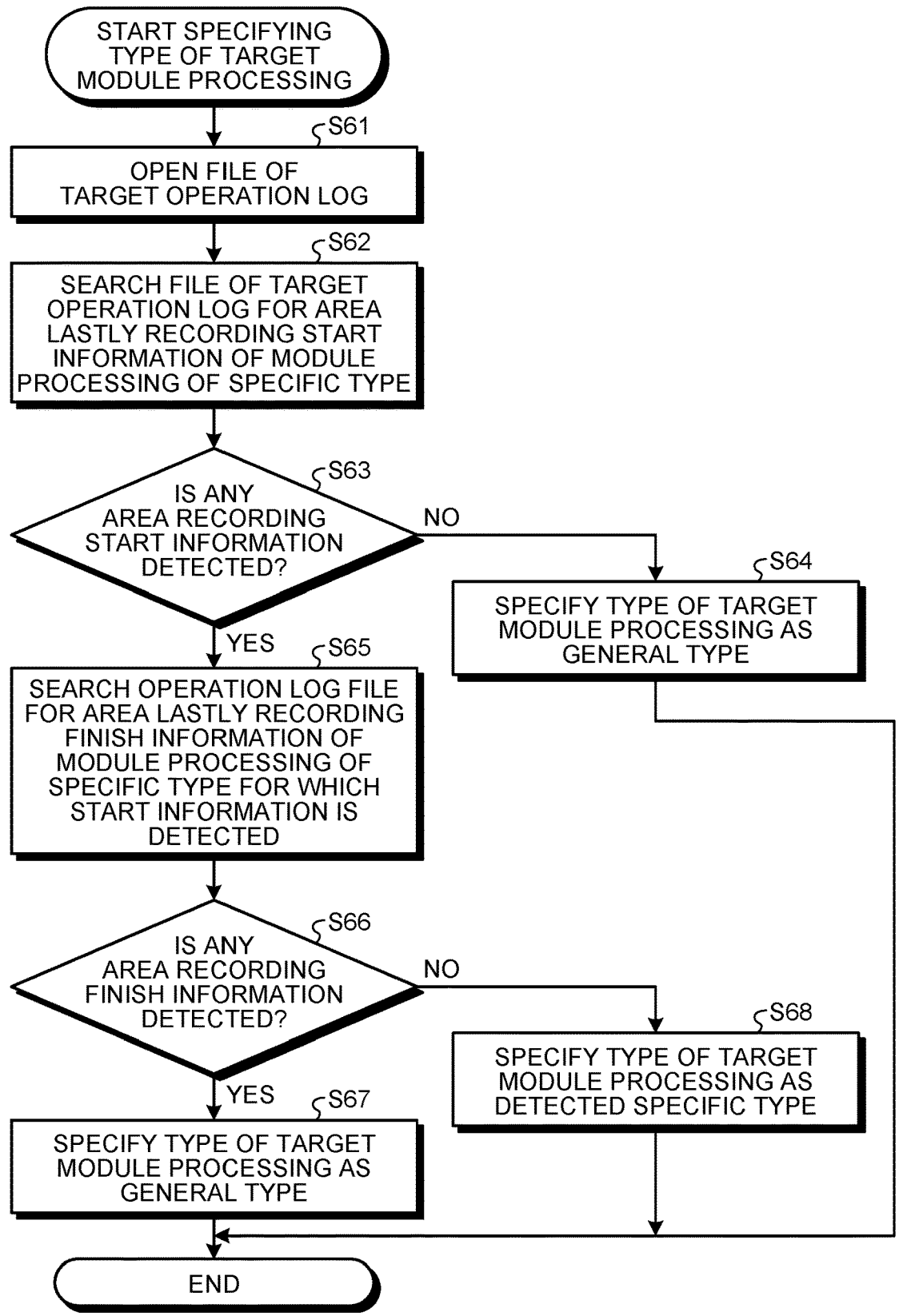
FIG. 5 is a flowchart illustrating flow of processing of specifying the type of target module processing.

FIG. 5 is a flowchart illustrating flow of processing of specifying the type of the target module processing. The monitoring unit 40 specifies the type of the target module processing by executing the processing with the flow illustrated in FIG. 5 at, for example, S55 of FIG. 4.

In the present example, the list storage unit 34 stores therein an allow list for one of the predetermined specific types or each of two or more of the predetermined specific types of module processing and an allow list for the general type.

First, at S61, the monitoring unit 40 opens the file of the target operation log. Thereafter, at S62, the monitoring unit 40 searches the file of the target operation log for an area lastly recording start information of the module processing of any specific type in one of the specific types or two or more of the specific types of module processing.

Thereafter, at S63, the monitoring unit 40 determines whether any area lastly recording start information of the module processing of any specific type is detected. When the area is not detected (No at S63), the monitoring unit 40 proceeds the processing to S64. At S64, the monitoring unit specifies the type of the target module processing as the general type. The monitoring unit 40 finishes the processing at S64, and ends the flow.

When the area is detected (Yes at S63), the monitoring unit 40 proceeds the processing to S65. At S65, the monitoring unit 40 searches the file of the target operation log for the area recording the finish information of the module processing of the specific type corresponding to the detected start information after the detected start information.

Thereafter, at S66, the monitoring unit 40 determines whether any area recording the finish information of the module processing of the specific type corresponding to the detected start information is detected. When the area is detected (Yes at S66), the monitoring unit 40 proceeds the processing to S67. At S67, the monitoring unit 40 specifies the type of the target module processing as the general type. The monitoring unit 40 finishes the processing at S67, and ends the flow.

When the area is not detected (No at S66), the monitoring unit 40 proceeds the processing to S68. At S68, the monitoring unit 40 specifies the type of the target module processing as the specific type corresponding to the detected start information. The monitoring unit 40 finishes the processing at S68, and ends the flow.

As described above, the monitoring unit 40 detects the last start information serving as the start information lastly recorded on the target operation log. When the type of the module processing corresponding to the last start information is one of the specific types or two or more of the specific types and no finish information of module processing corresponding to the last start information exists after the last start information, the monitoring unit 40 specifies the type of the target module processing as the type of the module processing corresponding to the last start information. When the type of the module processing corresponding to the last start information is not one of the specific types or two or more of the specific types or when the finish information of module processing corresponding to the last start information exists after the last start information, the monitoring unit 40 specifies the type of the target module processing as the general type.

In this manner, when the type of the target module processing agrees with one of the specific types or two or more of the specific types, the monitoring unit 40 can specify the type of the target module processing as the agreed specific type. When the type of the target module processing does not agree with one of the specific types or two or more of the specific types, the monitoring unit 40 can specify the type of the target module processing as the general type.

First Modification

Figure 6:
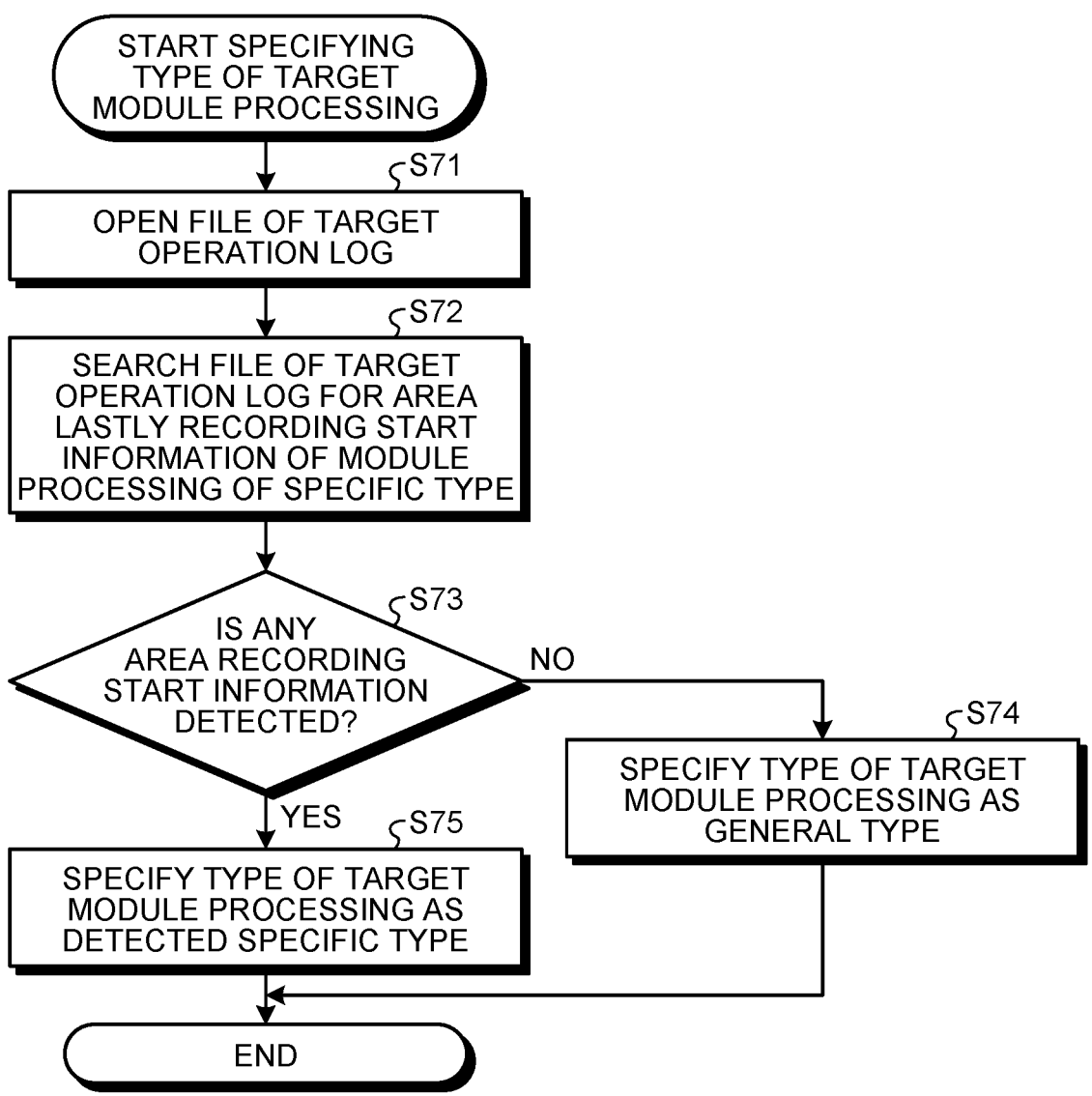
FIG. 6 is a flowchart illustrating flow of processing of specifying the type according to a first modification.

FIG. 6 is a flowchart illustrating flow of processing of specifying the type of the target module processing according to a first modification.

When an application computer program is executed, there are the cases where the processor of the information processing apparatus 12 executes recording on the operation log with the flow of processing different from that of FIG. 3. For example, in the process, although the processor records the start information on the operation log when the module processing is started, there are the cases where the processor records no finish information on the operation log when the module processing is finished. In such a case, the monitoring unit 40 specifies the type of the target module processing with the flow as illustrated in FIG. 6.

First, at S71, the monitoring unit 40 opens the file of the target operation log. Thereafter, at S72, the monitoring unit 40 searches the file of the target operation log for an area lastly recording start information of the module processing of any specific type in one of the specific types or two or more of the specific types of module processing.

Thereafter, at S73, the monitoring unit 40 determines whether any area lastly recording start information of the module processing of any specific type is detected. When the area is not detected (No at S73), the monitoring unit 40 proceeds the processing to S74. At S74, the monitoring unit 40 specifies the type of the target module processing as the general type. The monitoring unit 40 finishes the processing at S74, and ends the flow.

When the area is detected (Yes at S73), the monitoring unit 40 proceeds the processing to S75. At S75, the monitoring unit 40 specifies the type of the target module processing as the specific type corresponding to the detected start information. The monitoring unit 40 finishes the processing at S75, and ends the flow.

As described above, the monitoring unit 40 detects the last start information serving as the last start information recorded on the target operation log. When the type of the module processing corresponding to the last start information is any of one or a plurality of specific types, the monitoring unit 40 specifies the type of the target module processing as the type of the module processing corresponding to the last start information. When the type of the module processing corresponding to the last start information is not one of the specific types or two or more of the specific types, the monitoring unit 40 specifies the type of the target module processing as the general type.

In this manner, the monitoring unit 40 can specify which of one or a plurality of specific types the type of the target module processing is. In addition, when the type of the target module processing does not agree with one of the specific types or two or more of the specific types, the monitoring unit 40 can specify the type of the target module processing as the general type.

Second Modification

Figure 7:
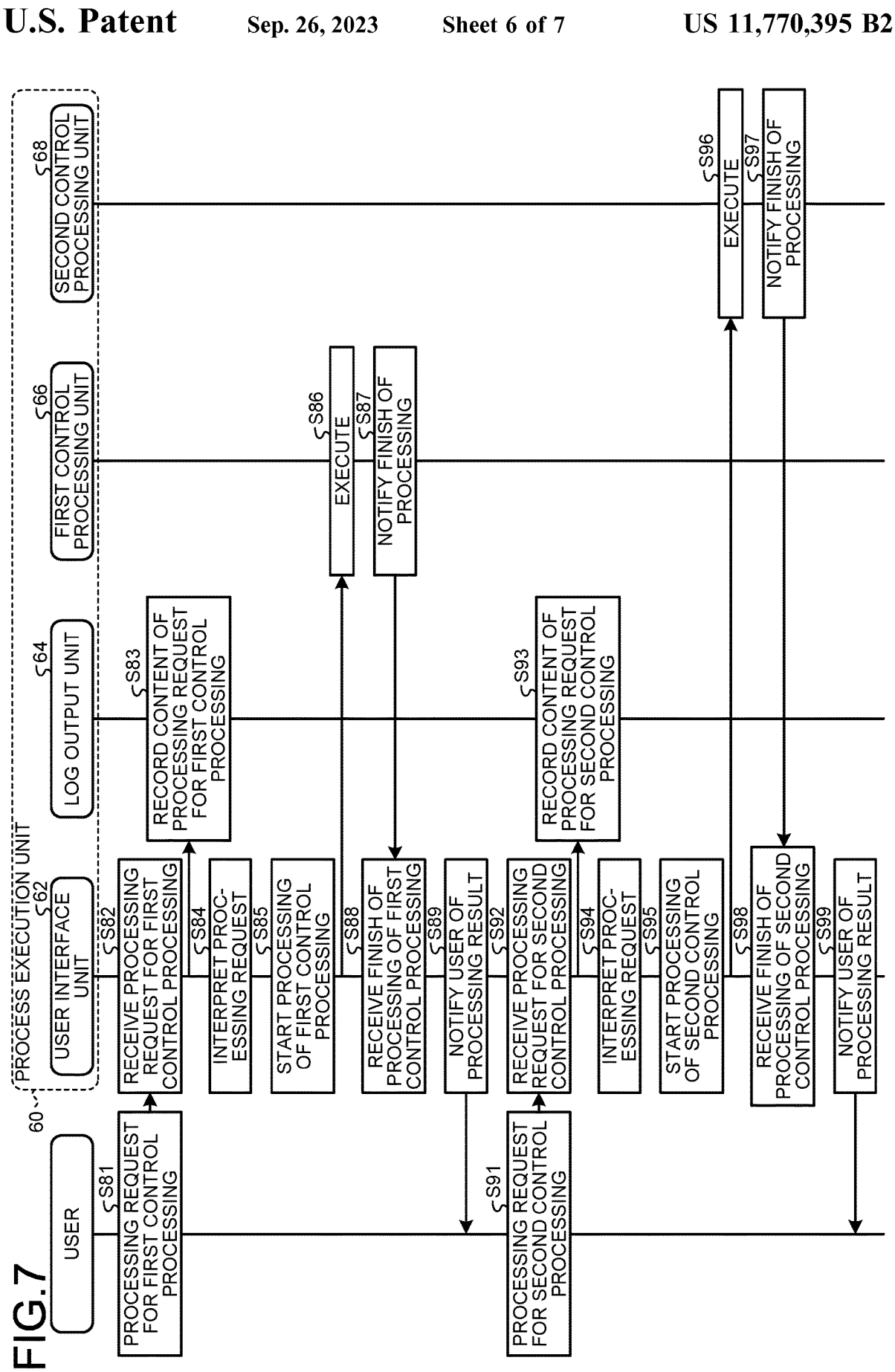
FIG. 7 is a sequence diagram illustrating an example of flow of processing of a second process according to a second modification.

FIG. 7 is a sequence diagram illustrating an example of flow of processing of a second process according to the second modification. The process execution unit 60 of the information processing apparatus 12 may execute the processing with, for example, the flow illustrated in FIG. 7, instead of the processing with the flow illustrated in FIG. 3.

First, the user inputs a processing request for the first control processing to the information processing apparatus 12 (S81). For example, the user inputs a processing request for the first control processing to the information processing apparatus 12 by inputting a control value to a text box corresponding to the first control processing or clicking a button corresponding to the first control processing.

Thereafter, the user interface unit 62 receives the processing request for the first control processing (S82). Thereafter, the log output unit 64 records the content of the processing request received with the process at starting of the first control processing, on an operation log of the first process (S83). For example, the log output unit 64 records an identifier of the text box to which the control value is input, an identifier of the clicked button, and/or the control value or the like input to the text box, and a time stamp indicating the start time on the operation log.

Thereafter, the user interface unit 62 interprets the processing request input by the user, and specifies that the processing request is a processing request for the first control processing (S84). Thereafter, the user interface unit 62 instructs the first control processing unit 66 to start the first control processing (S85).

Thereafter, the first control processing unit 66 executes the first control processing (S86). Thereafter, at finishing of the first control processing, the first control processing unit 66 notifies the user interface unit 62 of the finish of processing of the first control processing (S87). For example, the first control processing unit 66 notifies the user interface unit 62 of a processing result of the first control processing, such as a return value of the function.

Thereafter, the user interface unit 62 receives the finish of processing of the first control processing (S88). Thereafter, the user interface unit 62 notifies the user of the processing result of the first control processing (S89). For example, the user interface unit 62 updates a control value corresponding to the first control processing and displayed on the display to the latest value.

Thereafter, the user inputs a processing request for the second control processing to the information processing apparatus 12 (S91). Thereafter, the user interface unit 62 receives the processing request for the second control processing (S92). Thereafter, the log output unit 64 records the content of the processing request received with the process at starting of the second control processing, on the operation log of the second process (S93).

Thereafter, the user interface unit 62 interprets the processing request input by the user, and specifies that the processing request is a processing request for the second control processing (S94). Thereafter, the user interface unit 62 instructs the second control processing unit 68 to start the second control processing (S95).

Thereafter, the second control processing unit 68 executes the second control processing (S96). Thereafter, at finishing of the second control processing, the second control processing unit 68 notifies the user interface unit 62 of the finish of processing of the second control processing (S97). Thereafter, the user interface unit 62 receives the finish of processing of the second control processing (S98). Thereafter, the user interface unit 62 notifies the user of the processing result of the second control processing (S99).

As described above, according to the second modification, in each of the processes, the processor of the information processing apparatus 12 records the content of the processing request received with the process at starting of the module processing, on the operation log.

Figure 8:
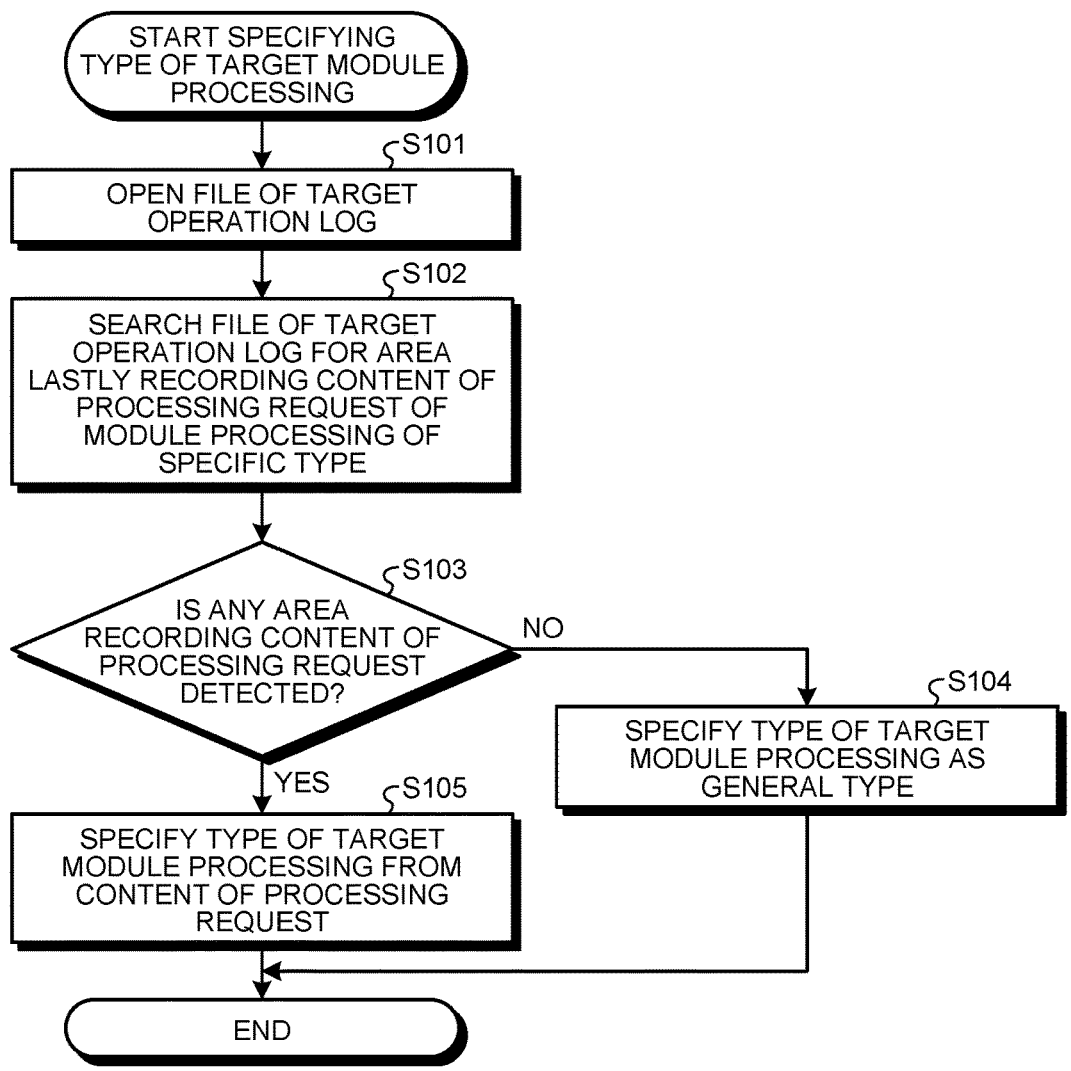
FIG. 8 is a flowchart illustrating flow of processing of specifying the type according to the second modification.

FIG. 8 is a flowchart illustrating flow of processing of specifying the type of the target module processing according to the second modification. When the process execution unit 60 of the information processing apparatus 12 executes the processing with the flow illustrated in FIG. 7, the monitoring unit 40 specifies the type of the target module processing by executing the processing with the flow illustrated in FIG. 8.

First, at S101, the monitoring unit 40 opens the file of the target operation log. Thereafter, at S102, the monitoring unit 40 searches the file of the target operation log for an area lastly recording the content of the processing request for the module processing of any specific type in one or a plurality of specific types of module processing.

Thereafter, at S103, the monitoring unit 40 determines whether any area lastly recording the content of the processing request for the module processing of any specific type is detected. When the area is not detected (No at S103), the monitoring unit 40 proceeds the processing to S104. At S104, the monitoring unit 40 specifies the type of the target module processing as the general type. The monitoring unit 40 finishes the processing at S104, and ends the flow.

When the area is detected (Yes at S103), the monitoring unit 40 proceeds the processing to S105. At S105, the monitoring unit 40 determines which module processing of one or a plurality of specific types of module processing is executed, on the basis of the description of the content of the detected processing request. For example, the information processing apparatus 12 may include a correspondence information memory storing therein a table associating the identifier assigned to the button or the text box receiving start of the processing request with the type of the module processing. In this case, the monitoring unit 40 specifies the type of the corresponding module processing, on the basis of the identifier of the button, the text box, or the like described in the content of the processing request and the description in the table. The monitoring unit 40 finishes the processing at S105, and ends the flow.

As described above, the monitoring unit 40 detects the last request information serving as the content of the processing request lastly recorded on the target operation log. When the type of the module processing corresponding to the last request information is one of the specific types or two or more of the specific types, the monitoring unit 40 specifies the type of the target module processing as the type of the module processing corresponding to the last request information. When the type of the module processing corresponding to the last request information is not one of the specific types or two or more of the specific types, the monitoring unit 40 specifies the type of the target module processing as the general type.

In this manner, the monitoring unit 40 can specify which of one or a plurality of specific types the type of the target module processing is. In addition, when the type of the target module processing does not agree with one of the specific types or two or more of the specific types, the monitoring unit 40 can specify the type of the target module processing as the general type.

As described above, the information processing apparatus 12 according to the present embodiment stores therein allow lists for respective types of module processing, and each of the allow lists describes an execution-permitted system operation. The information processing apparatus 12 detects that any system operation is executed, specifies the target process that has executed execution-detected system operation, specifies the target operation log indicating the history of the processing content of the target process, and specifies the type of the target module processing by analyzing the target operation log. In addition, the information processing apparatus 12 outputs anomaly information, when the execution-detected system operation is not included in the allow list for the type of the target module processing. In this manner, the information processing apparatus 12 can surely detect an anomaly even in the process executing a number of types of module processing.

Hardware Configuration

Figure 9:
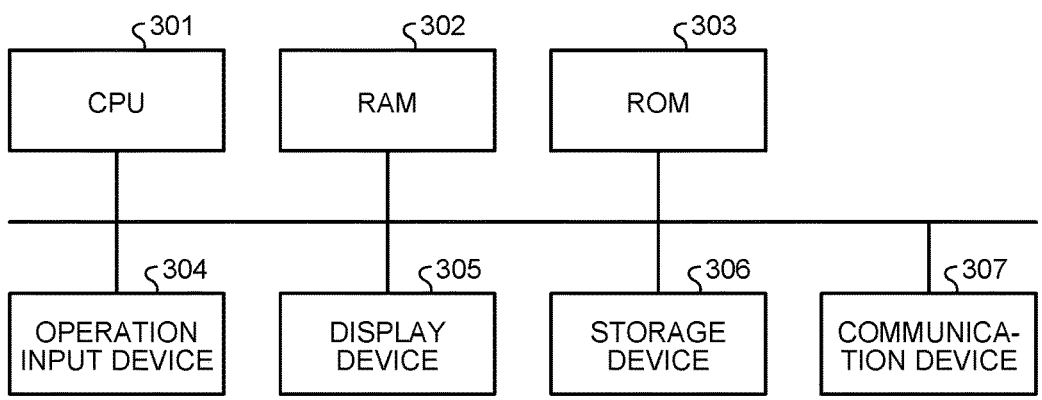
FIG. 9 is a diagram illustrating hardware configuration of the information processing apparatus.

FIG. 9 is a diagram illustrating hardware configuration of the information processing apparatus 12 according to the embodiment. The information processing apparatus 12 is achieved with, for example, a computer having hardware configuration as illustrated in FIG. 9. The information processing apparatus 12 includes a central processing unit (CPU) 301, a random access memory (RAM) 302, a read only memory (ROM) 303, an operation input device 304, a display device 305, a storage device 306, and a communication device 307. These units are connected via a bus.

The CPU 301 is a processor executing arithmetic processing, control processing, and the like in accordance with computer programs. The CPU 301 executes various types of processing in cooperation with computer programs stored in the ROM 303 and the storage device 306 or the like, with a predetermined region of the RAM 302 used as a work area.

The RAM 302 is a memory, such as a synchronous dynamic random access memory (SDRAM). The RAM 302 functions as a work area for the CPU 301. The ROM 303 is a memory unrewritably storing computer programs and various types of information therein.

The operation input device 304 is an input device, such as a mouse and a keyboard. The operation input device 304 receives information input by an operation of the user as an instruction signal, and outputs the instruction signal to the CPU 301.

The display device 305 is a display device, such as a liquid crystal display (LCD). The display device 305 displays various types of information on the basis of a display signal from the CPU 301.

The storage device 306 is a device writing and reading data to and from a semiconductor storage medium, such as a flash memory, or a magnetically or optically recordable storage medium. The storage device 306 writes and reads data to and from a storage medium in accordance with control of the CPU 301. The communication device 307 communicates with an external device via a network in accordance with control of the CPU 301.

The monitoring computer program executed with the computer has a module structure including an operation detecting module, a process specifying module, a log specifying module, a type specifying module, a comparing module, and an output module. The monitoring computer program is expanded and executed on the RAM 302 with the CPU 301 (processor) to cause the computer to function as the operation detecting unit 42, the process specifying unit 44, the log specifying unit 46, the type specifying unit 48, the comparing unit 50, and the output unit 52. In addition, the RAM 302 and the storage device 306 function as the log storage unit 32 and the list storage unit 34.

The computer program executed with the computer is recorded and provided in a computer-readable medium, such as a CD-ROM, a flexible disk, a CD-R, and a digital versatile disc (DVD), as a file of a format installable in or executable with the computer.

The computer program may be configured to be stored in a computer connected to a network, such as the Internet, and provided by being downloaded via the network. The computer program may be configured to be provided or distributed via a network, such as the Internet. The computer program executed with the information processing apparatus 12 may be configured to be incorporated and provided in advance in the ROM 303 or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a hardware processor configured to execute an operating system and execute application computer program under control of the operating system; and
a list storage device configured to store therein an allow list for each application computer program for each type of module processing, the allow list describing an execution-permitted system operation, the module processing being processing executed with a computer program component managed with the operating system, the system operation being an operation calling a function incorporated in the operating system and causing the function to execute processing in the process, wherein
the processor is configured to:
detect that any of system operations is executed;
specify a target process serving as a process that has executed execution-detected system operation, the process being processing executed with an application computer program being executed;
specify a target operation log serving as an operation log indicating history of a processing content of the target process;
specify a type of target module processing serving as the module processing that has executed the execution-detected system operation, by analyzing the target operation log; and
output anomaly information indicating that an anomaly occurs, when the allow list for the type of the target module processing of the application computer program corresponding to the target process does not include the execution-detected system operation;
the list storage device stores therein the allow list for one of predetermined specific types or each of two or more of the predetermined specific types of the module processing and the allow list for a general type;
the general type is a type indicating all types that are not included in one of the specific types or two or more of the specific types, in a unified manner;
in the process,
at starting of the module processing, the processor records start information indicating the type of the module processing and indicating that the module processing is started on the operation log, and
at finishing of the module processing, the processor records finish information indicating the type of the module processing and indicating that the module processing is finished on the operation log; and
in specifying the type of the target module processing, the processor
detects last start information serving as the start information lastly recorded on the target operation log,
specifies the type of the target module processing as the type of the module processing corresponding to the last start information, when the type of the module processing corresponding to the last start information is the one of the specific types or the two or more of the specific types and the finish information of the module processing corresponding to the last start information does not exist after the last start information, and
specifies the type of the target module processing as the general type, when the type of the module processing corresponding to the last start information is not one of the specific types or two or more of the specific types or the finish information of the module processing corresponding to the last start information exists after the last start information.

2. The information processing apparatus according to claim 1, wherein
in detecting that the system operation is executed, the processor
detects that a specific system operation serving as the system operation determined in advance is executed, and specifies a processing target for the specific system operation execution of which is detected,
the allow list describes sets each composed of the execution-permitted system operation and the processing target for which the system operation is permitted, and
in outputting the anomaly information, the processor
outputs the anomaly information when the allow list for the type of the target module processing does not include a set of the execution-detected system operation and the specified processing target.

3. A computer program product having a non-transitory computer readable medium including programmed instructions, wherein the instructions, when executed by an information processing apparatus including a processor configured to execute an operating system and execute application computer programs under control of the operating system, and a list storage configured to store therein an allow list for each application computer program and for each type of module processing, the allow list describing an execution-permitted system operation, cause the processor to function as a monitoring device and cause the processor to perform:
detecting that any of system operations is executed;
specifying a target process serving as a process that has executed execution-detected system operation, the process being processing executed with an application computer program being executed;
specifying a target operation log serving as an operation log indicating history of a processing content of the target process;
specifying a type of target module processing serving as the module processing that has executed the execution-detected system operation, by analyzing the target operation log, the module processing being processing executed with a computer program component managed with the operating system, the system operation being an operation calling a function incorporated in the operating system and causing the function to execute processing in the process; and
outputting anomaly information indicating that an anomaly occurs, when the allow list for the type of the target module processing of the application computer program corresponding to the target process does not include the execution-detected system operation,
wherein
the list storage stores therein the allow list for one of predetermined specific types or each of two or more of the predetermined specific types of the module processing and the allow list for a general type;
the general type is a type indicating all types that are not included in one of the specific types or two or more of the specific types, in a unified manner;
in the process, the instructions cause the processor to perform:
at starting of the module processing, recording start information indicating the type of the module processing and indicating that the module processing is started on the operation log, and
at finishing of the module processing, recording finish information indicating the type of the module processing and indicating that the module processing is finished on the operation log; and
in specifying the type of the target module processing, the instructions cause the processor to perform:
detecting last start information serving as the start information lastly recorded on the target operation log,
specifying the type of the target module processing as the type of the module processing corresponding to the last start information, when the type of the module processing corresponding to the last start information is the one of the specific types or the two or more of the specific types and the finish information of the module processing corresponding to the last start information does not exist after the last start information, and
specifying the type of the target module processing as the general type, when the type of the module processing corresponding to the last start information is not one of the specific types or two or more of the specific types or the finish information of the module processing corresponding to the last start information exists after the last start information.

4. An information processing system comprising:
an information processing apparatus;
one or more target devices; and
a controller configured to control one or more of the target devices in accordance with an instruction from the information processing apparatus,
the information processing apparatus comprising:
a processor configured to execute an operating system and execute application computer programs under control of the operating system; and
a list storage configured to store therein an allow list for each application computer program and for each type of module processing, the allow list describing an execution-permitted system operation, the module processing being processing executed with a computer program component managed with the operating system, the system operation being an operation calling a function incorporated in the operating system and causing the function to execute processing in the process,
wherein
the processor is configured to:
detect that any of system operations is executed;
specify a target process serving as a process that has executed execution-detected system operation, the process being processing executed with an application computer program being executed;
specify a target operation log serving as an operation log indicating history of a processing content of the target process;
specify a type of target module processing the serving as the module processing that has executed execution-detected system operation, by analyzing the target operation log; and
output anomaly information indicating that an anomaly occurs, when the allow list for the type of the target module processing of the application computer program corresponding to the target process does not include the execution-detected system operation;
the list storage stores therein the allow list for one of predetermined specific types or each of two or more of the predetermined specific types of the module processing and the allow list for a general type;

the general type is a type indicating all types that are not included in one of the specific types or two or more of the specific types, in a unified manner;

in the process,
- at starting of the module processing, the processor records start information indicating the type of the module processing and indicating that the module processing is started on the operation log, and
- at finishing of the module processing, the processor records finish information indicating the type of the module processing and indicating that the module processing is finished on the operation log; and in specifying the type of the target module processing, the processor
- detects last start information serving as the start information lastly recorded on the target operation loci,
- specifies the type of the target module processing as the type of the module processing corresponding to the last start information, when the type of the module processing corresponding to the last start information is the one of the specific types or the two or more of the specific types and the finish information of the module processing corresponding to the last start information does not exist after the last start information, and
- specifies the type of the target module processing as the general type, when the type of the module processing corresponding to the last start information is not one of the specific types or two or more of the specific types or the finish information of the module processing corresponding to the last start information exists after the last start information.

* * * * *